United States Patent [19]

Frykhult

[11] 4,153,558

[45] May 8, 1979

[54] HYDROCYCLONE SEPARATOR

[75] Inventor: Rune H. Frykhult, Huddinge, Sweden

[73] Assignee: AB Celleco, Stockholm, Sweden

[21] Appl. No.: 884,440

[22] Filed: Mar. 8, 1978

[51] Int. Cl.² .......................... B01D 21/26; B01D 33/02

[52] U.S. Cl. ................................ 210/512 R; 209/144; 209/211

[58] Field of Search ........................... 210/304, 512 R; 209/144, 211; 55/459 R, 459 C

[56] References Cited

U.S. PATENT DOCUMENTS

| | | | |
|---|---|---|---|
| 2,010,128 | 8/1935 | Arnold ................................ | 209/144 |
| 3,098,036 | 7/1963 | Neumann ............................ | 209/144 |

*Primary Examiner*—Frank Sever

*Attorney, Agent, or Firm*—Cyrus S. Hapgood

[57] ABSTRACT

The separation chamber has a circular cylindrical part with a tangential inlet for the mixture and a central outlet for the light separated fraction, the chamber also having a conical part forming an outlet for the separated heavy fraction. A first guide bar on the wall of said conical part gives the heavy fraction a component of movement directed radially inward, and a second guide bar on said wall between the first bar and the heavy fraction outlet gives the heavy fraction a component of movement directed axially toward the light fraction outlet.

4 Claims, 3 Drawing Figures

3
4

1
2
6
6
II
II
III
III
7
5

2

2
6

2

7

HYDROCYCLONE SEPARATOR

This invention relates to a hydrocyclone separator for the separation of a mixture into one light first fraction of relatively low density, and into one heavy second fraction of relatively high density, comprising a separation chamber consisting of one circular cylindric part provided with a tangential inlet for the feed mixture and a central outlet for the light fraction, as well as a conical part, forming an outlet for the heavy fraction, at least one guide bar being provided to give the heavy fraction, flowing helically along the wall of the conical part, a component of movement directed radially inwards.

Hydrocyclone separators have many uses. A major one is in the cellulose industry for the purification of cellulose fiber suspensions. Generally, a hydro cyclone separator system includes several stages coupled in series, with every stage comprisng several hydrocylcone separators connected in parallel, having inlet and outlet chambers in common. Such a hydrocyclone separator system separates the original, highly diluted cellulose suspension into diluted, purified fibers, called the "light fraction", and thickened impurities, called the "heavy fraction". As modern process technology has advanced, cellulose suspension temperatures have increased, causing viscosities to decrease. With decreasing viscosities and the same number of stages, the separting power of a hydrocyclone separtor system decreases and more cellulose fibers are discarded with the heavy fraction. It is, of course, desirable to get as small amount of cellulose fibers in the heavy fraction as possible. At the same time, from an evironmental point of view, it is aimed at keeping the volume flow of the heavy fraction on a low level, which means that the concentration of impurities in this fraction will be high. The problem is to provide a hydrocyclone separator that separates efficiently into one light first fraction of relatively low density, and into one heavy second fraction of relatively high density, the latter being allowed to be discharged from the hydrocyclone separator in a minimal volume flow with a high concentration.

Many attempts have been made, some on a commercial scale, to solve the problems of fiber loss and plugging of the discharge outlet of the relatively heavy fraction. Most of the attempts entail supplying water under pressure to the individual hydrocyclone separators to dilute the heavy fraction and to wash out the valuable fibers. Generally, water is supplied tangentially near the heavy fraction outlet end of the hydrocyclone separator, or through a channel ending at a radial distance from the wall of the hydrocyclone separator within the heavy fraction outlet end. Discharge chambers, formed like cylinders or cones and provided with a tangential inlet for diluting water, directly connected to the heavy fraction oulet of the hydrocyclone separator have been used, as well. At best these attempts have solved the plugging problems and reduced the fiber loss to some extent.

Attempts have been made to provide the conical part of hydrocyclone separators with axially directed guide bars, designed to give the heavy fraction, flowing helically along the wall of the conical part, a component of movement directed radially inwards, thus to some extent transferring light components from the heavy fraction to the light fraction, that flows towards its outlet. The desired result has not been obtained by using the arrangements mentioned.

It might seen obvious to make the discharge outlet of the heavy fraction larger than it has been generally hitherto. This, however, is not possible, since such a design would result in too large a flow of the heavy fraction. Furthermore, said axially directed guide bars occupy part of the separation space in the conical part of the separation chamber. Considering the wear that these guide bars are subject to, they have to be designed with a greater radial extension than that functionally needed. Elimination of this drawback, regarding the separation space, would mean reduction of the cone angle. This would mean that the conical part of the separation chamber would converge less abruptly, which is not simply possible, since the conical part of the separation chamber would be very long, if the diameter of the heavy fraction discharge outlet opening would be kept.

According to the invention, the problems mentioned of fiber loss and plugging of the discharge outlet of the heavy fraction are solved in a surprisingly easy way by providing, in a hydrocyclone separator of the kind mentioned by way of introduction, in the vicinity of the discharge outlet of the conical part a guide means, designed as at least one guide bar, arranged along the inner wall of the conical part, which guide means gives the heavy fraction flowing towards the discharge outlet of the conical part a component a movement directed axially inwards towards the separation chamber.

This arrangement allows the cone angle of the conical part of the hydrocyclone separator to be reduced to give space for the guide bar or the guide bars without occupying the separation space available, since the discharge outlet opening for the heavy fraction may be rather large, without making the heavy fraction flow too large.

The advantages of the invention are thus obtained by combining the axial guide bars, known per se, and said guide means.

In a preferred embodiment of the invention the guide means is also designed to give the heavy fraction, flowing towards the discharge outlet of the conical part, a component of movement directed radially inwards.

Preferably, the guide means is designed as a screw path.

According to the invention, compared to common hydrocyclone separators for cellulose fiber suspensions, the loss of cellulose fiber in the discharged heavy fraction may be reduced by more than half of the amounts, that have been usual hitherto, without increasing the content of impurities in the purified cellulose suspension, i.e. the light fraction. As a reduced content of cellulose fibers goes with the heavy fraction, this fraction will flow more easily through its discharge outlet. Furthermore, as mentioned, this discharge outlet may be designed with a larger opening. Thus the risks of plugging have been practically eliminated.

One embodiment of the invention shall now be described more in detail, as an example, reference being made to the enclosed drawing.

In the drawing FIG. 1 shows a hydrocyclone separator according to the invention, in a longitudinal sectional view, with a guide means in a perspective view.

Figure 1:
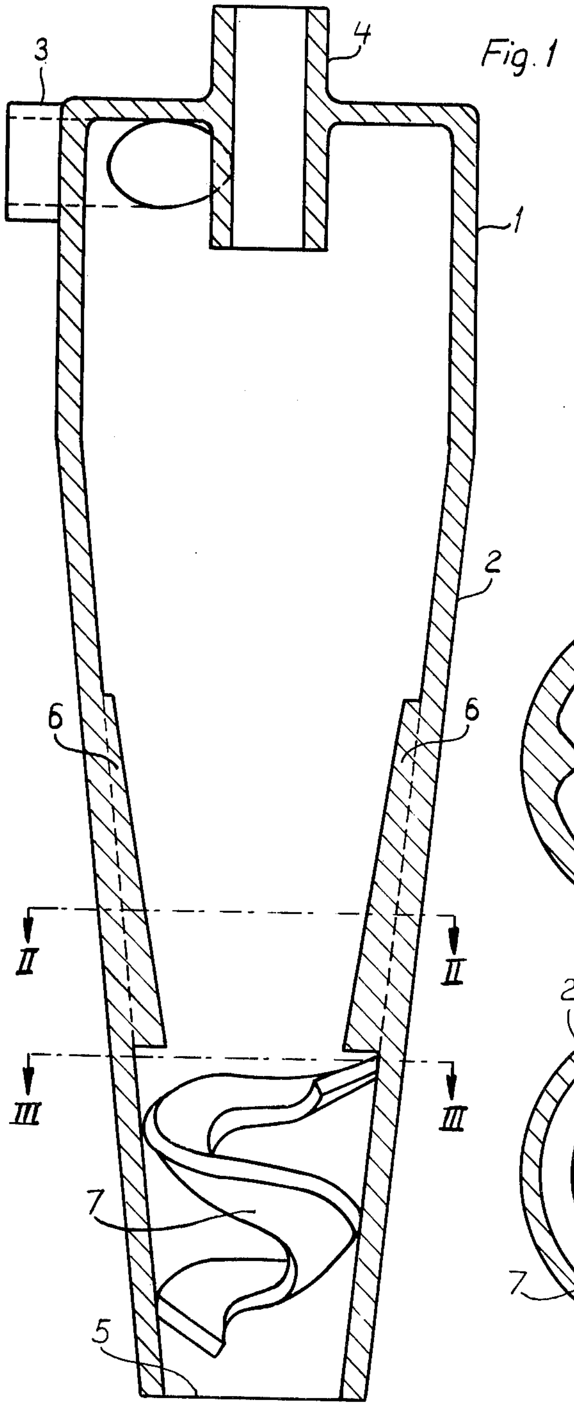
Figure 2:
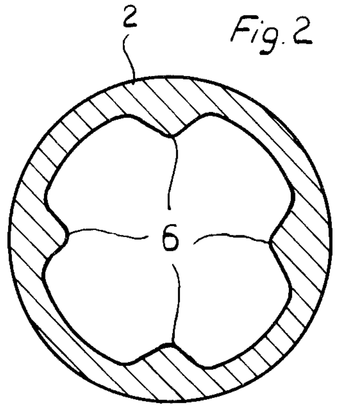
FIG. 2 shows a sectional view along line II—II in FIG. 1.
Figure 3:
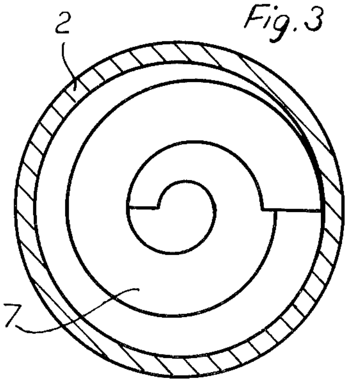
FIG. 3 shows a sectional view along line III—III in FIG. 1, with a perspective view of the guide means.

As shown in FIG. 1, a hydrocyclone separator with a circular cylindric part 1 and a conical part 2 has a tangential inlet 3 for the mixture feed to be separated, and a central discharge outlet 4 for the light fraction and a discharge outlet 5 from the conical part for the heavy fraction. In the conical part 2 there are four guide bars 6, axially directed, evenly distributed around the circumference of the conical part. These guide bars are designed, in a sectional view, cfr. FIG. 2, as symmetrical ridges. The height of these ridges increases in the direction towards the discharge outlet 5. Between the guide bars 6 and the discharge outlet 5 there is provided a guide means 7 in the form of a screw path, running 1½ turns along the inner wall of the conical part 2. The screw path is designed to give the heavy fraction, flowing towards the discharge outlet 5 an axial component of movement against the flow, i.e., in the direction of the central discharge outlet 4 for the light fraction. If the hydrocyclone separator is regarded from the feed inlet end, the flow moves clockwise, whereas the screw path of the guide means 7 is arranged to run counterclockwise.

In the embodiment shown the screw path plane also inclines in relation to the horizontal plane, towards the discharge outlet 5, whereby the heavy fraction, flowing towards the discharge outlet 5, is also given a component of movement, directed radially inwards.

As is shown in the figures, the guide means 7 is designed in such a way that the discharge area is relatively large, which means that there is left free passage for the heavy fraction.

The hydrocyclone disclosed operates as follows. The mixture, that is to be separated into one light first fraction of relatively low density and into one heavy second fraction of relatively high density is fed through the inlet 3 and flows helically towards the conical part 2 of the hydrocyclone separator. The constituents of the heavy fraction to be tend to move close to the wall, whereas the constituents of the light fraction to be tend to move in the direction towards the symmetry axis of the hydrocyclone separator. Some light constituents, however, will remain in the flow close to the wall. When the flow has reached the guide means 7 a major part of it, the light fraction, will change its direction of movement and will flow, with its direction of rotation unaltered, towards the discharge outlet 4, while a minor part of it, the heavy fraction, is discharged through the discharge outlet 5. Passing the guide bars 6 to flow is forced to bend inwards towards the symmetry axis of the hydrocyclone separator, light constituents being brought into contact with the light fraction, flowing towards the discharge outlet 4. The guide means 7 prevents a too large part of the flow to be discharged through the discharge outlet 5. In the embodiment shown, where the guide means 7 is provided with a screw path that is inclined in relation to the horizontal plane, favourable flow conditions are obtained in the vicinity of the guide means 7, which contributes to an advantageous separation result.

I claim:

1. A hydrocyclone separator for separating a liquids/solids mixture into a light first fraction of relatively low density and a heavy second fraction of relatively high density, the separator comprising means forming a separation chamber having a circular cylindrical part provided with a tangential inlet for said mixture and with a central outlet for said light fraction, the separation chamber also having a conical part forming an outlet for said heavy fraction, a first guide bar located on the wall of said conical chamber part and positioned and dimensioned to give the heavy fraction, flowing helically along said wall, a component of movement directed radially inward, and guide means including a second guide bar extending along said wall between said first guide bar and said heavy fraction outlet and positioned and dimensioned to give the heavy fraction, flowing toward the heavy fraction outlet, a component of movement directed axially toward said light fraction outlet.

2. The separator of claim 1, in which said guide means are slanted to also give the heavy fraction, flowing toward the heavy fraction outlet, a component of movement directed radially inward.

3. The separator of claim 1, in which said second guide bar forms a screw path running toward the heavy fraction outlet in the direction of rotation opposite to the direction in which the mixture from said tangential inlet rotates.

4. The separator of claim 3, in which said screw path, in extending radially inward from said wall of the conical part, slants toward the heavy fraction outlet, thereby also giving the heavy fraction a component of movement directed radially inward.

* * * * *